United States Patent
Murakami

(10) Patent No.: US 7,880,329 B2
(45) Date of Patent: Feb. 1, 2011

(54) MULTI-CHANNEL SWITCHING REGULATOR

(75) Inventor: Sadakazu Murakami, Kyoto (JP)

(73) Assignee: Rohm Co., Ltd. (JP)

( * ) Notice: Subject to any disclaimer, the term of this patent is extended or adjusted under 35 U.S.C. 154(b) by 204 days.

(21) Appl. No.: 12/345,527

(22) Filed: Dec. 29, 2008

(65) Prior Publication Data
US 2009/0189447 A1    Jul. 30, 2009

(30) Foreign Application Priority Data
Dec. 28, 2007  (JP) .............................. 2007-341078

(51) Int. Cl.
*H02J 3/14* (2006.01)
*H02M 3/335* (2006.01)

(52) U.S. Cl. ..................... 307/31; 363/21.14
(58) Field of Classification Search ............... 307/31; 323/284, 282, 271, 89; 363/21.06
See application file for complete search history.

(56) References Cited

U.S. PATENT DOCUMENTS

| | | | | |
|---|---|---|---|---|
| 5,396,412 A | * | 3/1995 | Barlage | ................. 363/89 |
| 6,462,965 B1 | * | 10/2002 | Uesono | ................. 363/21.14 |
| 7,538,531 B2 | * | 5/2009 | Ishii et al. | ................. 323/282 |
| 7,679,341 B2 | * | 3/2010 | Chen | ................. 323/224 |
| 7,755,340 B2 | * | 7/2010 | Karasawa et al. | ........... 323/282 |

FOREIGN PATENT DOCUMENTS

| | | |
|---|---|---|
| JP | 2003-289666 A | 10/2003 |
| WO | 2006/043370 A1 | 4/2006 |

* cited by examiner

*Primary Examiner*—Albert W Paladini
(74) *Attorney, Agent, or Firm*—Cantor Colburn LLP

(57) ABSTRACT

A controlling unit generates a pulse signal whose duty ratio is controlled so that the output voltage of each channel will be constant, and controls the main transistor and the rectification circuit of each channel in accordance with the pulse signal. The first synchronous rectification transistor is disposed in a direction such that the cathode of the body diode thereof is on the switching terminal side. The second synchronous rectification transistor is disposed in a direction such that the cathode of the body diode thereof is on the output terminal side. The controlling unit first turns on the first synchronous rectification transistor, and then turns on the second synchronous rectification transistor for a period of time in accordance with the pulse width of the pulse signal.

12 Claims, 3 Drawing Sheets

MULTI-CHANNEL SWITCHING REGULATOR

BACKGROUND OF THE INVENTION

1. Field of the Invention

The present invention relates to a technique of controlling a switching regulator having outputs in a plurality of channels.

2. Description of the Related Art

A secondary battery such as a lithium ion battery is mounted on various electronic apparatuses of recent years such as a portable telephone terminal, a Personal Digital Assistant (PDA), or a notebook-type personal computer. A lithium ion battery generates a battery voltage of about 3 to 4 V in accordance with a charged state. However, electronic devices such as a microprocessor operating at a power source voltage of 1.5 V or lower or a light-emitting diode operating at about 5 V are mounted on the electronic apparatuses. In order to give a suitable power source voltage to these devices, one makes use of a switching regulator that raises or lowers a voltage of the battery voltage.

Japanese Patent Application Laid-open (JP-A) No. 2003-289666 and International Publication No. 2006/043370A1 Pamphlet disclose a technique of providing a switching power supply apparatus that can generate a plurality of output voltages at a low cost with saved space. This technique aims at reducing the number of components by sharing the inductor and the main switch with a plurality of output voltages in a switching regulator for outputting a plurality of direct current voltages.

The inventor of the present invention propose a technique of constructing a transistor for synchronous rectification with two transistors that are connected in series, and disposing the transistors so that the body diodes of the two transistors will be in opposite directions (See International Publication No. 2006/043370A1 Pamphlet). The International Publication No. 2006/043370A1 Pamphlet discloses a controlling method of simultaneously turning on the two transistors that are connected in series and changing the on-time of one of the two transistors in accordance with the pulse width (duty ratio) of a pulse modulation signal.

[Patent Document 1] Japanese Patent Application Laid-Open No. 2003-289666

[Patent Document 2] International Publication No. 2006/043370A1 Pamphlet

When there is a time difference until the transistor for synchronous rectification is turned on after the main switch is turned off, the connection point of the inductor and the main switch (which is referred to as a switching terminal) will be in a high-impedance state, and the electric potential thereof swings largely, thereby raising a problem.

When the voltage of this switching terminal (which is referred to as a switching voltage) becomes an overvoltage, there is a fear that the loss of the circuit will be large, or the switching voltage exceeds the breakdown voltage of the transistor to affect the reliability of the circuit.

SUMMARY OF THE INVENTION

The present invention has been made in view of these circumstances, and an object thereof is to provide a switching regulator with the voltage of the switching terminal restrained.

An embodiment of the present invention relates to a step-up type switching regulator that raises an input voltage and generates output voltages in a plurality of channels. This switching regulator includes an inductor and a main transistor that are disposed in series between an input terminal to which the input voltage is applied and a fixed voltage terminal; a plurality of output capacitors that are disposed for respective output terminals of a plurality of channels; a plurality of rectification circuits that are disposed between respective output terminals and a switching terminal which is a connection point of the inductor and the main transistor, for respective output terminals of the plural channels; and a controlling unit that generates a pulse signal whose duty ratio is controlled so that the output voltage of each channel will be constant, and controls the main transistor and the rectification circuit of each channel in accordance with the pulse signal. The rectification circuit of at least one channel includes a first synchronous rectification transistor and a second synchronous rectification transistor that are disposed in series between a corresponding one of the output terminals and the switching terminal, where the first synchronous rectification transistor is disposed in a direction such that a cathode of a body diode thereof will be on the switching terminal side, and the second synchronous rectification transistor is disposed in a direction such that a cathode of a body diode thereof will be on the output terminal side. The controlling unit first turns on the first synchronous rectification transistor, and then turns on the second synchronous rectification transistor for a period of time in accordance with a pulse width of the pulse signal.

According to this embodiment, the switching terminal and the output terminal are coupled with the body diode of the second synchronous rectification transistor in the period from the time when the first synchronous rectification transistor is turned on to the time when the second synchronous rectification transistor is turned on, so that the switching terminal can be prevented from having a high impedance, thereby restraining the rise of the voltage of the switching terminal (switching voltage).

The controlling unit may turn on the first synchronous rectification transistor before the main transistor is turned off.

In this case, the period of time in which the switching terminal has a high impedance can be substantially eliminated, thereby more effectively restraining the overvoltage.

The controlling unit may turn on the first synchronous rectification transistor at a timing when the main transistor is turned on.

In this case, there will be no need to separately generate a timing of turning on the first synchronous rectification transistor, thereby facilitating the control.

The controlling unit may turn on the second synchronous rectification transistor after the main transistor is turned off. In this case, electric conduction between the output terminal and the fixed voltage terminal (ground terminal) via the main transistor and the rectification circuit can be prevented.

The controlling unit may turn off the first synchronous rectification transistor at a timing when the main transistor is turned on next.

In this case, there will be no need to separately generate a timing of turning off the first synchronous rectification transistor, thereby facilitating the control.

The controlling unit in a lightly loaded state may repeat a state in which the main transistor and the first synchronous rectification transistor are turned on, a state in which the first synchronous rectification transistor and the second synchronous rectification transistor are turned on, and a state in which the first synchronous rectification transistor is turned on.

Another embodiment of the present invention relates to a method of controlling a step-up type switching regulator that raises a voltage of an input voltage and generates output voltages in N channels (N is an integer of two or more) The step-up type switching regulator includes an inductor and a main transistor that are disposed in series between an input terminal to which the input voltage is applied and a fixed voltage terminal; N output capacitors that are disposed in series between respective output terminals and the fixed voltage terminal for respective output terminals of the N channels; and N rectification circuits that are disposed between respective output terminals and a switching terminal which is a connection point of the inductor and the main transistor, for respective output terminals of the N channels. The rectification circuit of at least one channel includes a first synchronous rectification transistor and a second synchronous rectification transistor that are disposed in series between a corresponding one of the output terminals and the switching terminal, where the first synchronous rectification transistor is disposed in a direction such that a cathode of a body diode thereof is on the switching terminal side, and the second synchronous rectification transistor is disposed in a direction such that a cathode of a body diode thereof is on the output terminal side. The controlling method, while incrementing i, repetitively executes turning on the main transistor for a certain period of time, turning on the first synchronous rectification transistor of an i-th channel for a certain period of time, and turning on the second synchronous rectification transistor of the i-th channel for a certain period of time after the first synchronous rectification transistor of the i-th channel is turned on.

The first synchronous rectification transistor of the i-th channel may be turned on before the main transistor is turned off.

A timing when the main transistor is turned on may be simultaneous with a timing when the first synchronous rectification transistor of the i-th channel is turned on.

The second synchronous rectification transistor of the i-th channel may be turned on after the main transistor is turned off.

A timing when the first synchronous rectification transistor of the i-th channel is turned off may be simultaneous with a timing when the main transistor is turned on after i is incremented.

The controlling method may further include generating a pulse signal for each channel whose duty ratio is controlled so that the output voltages of the N channels is approximated to respective target values. The second synchronous rectification transistor of the i-th channel may be turned on for a period of time in accordance with a pulse width of the pulse signal of the i-th channel.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, "the state in which a member A is connected to a member B" includes a case where the member A and the member B are directly physically connected and a case where the member A and the member B are indirectly connected via another member that does not affect the electric connection state. Similarly, "the state in which a member C is disposed between a member A and a member B" includes a case where the member A and the member C or the member B and the member C are directly connected and a state in which the members are indirectly connected via another member that does not affect the electric connection state.

Figure 1:
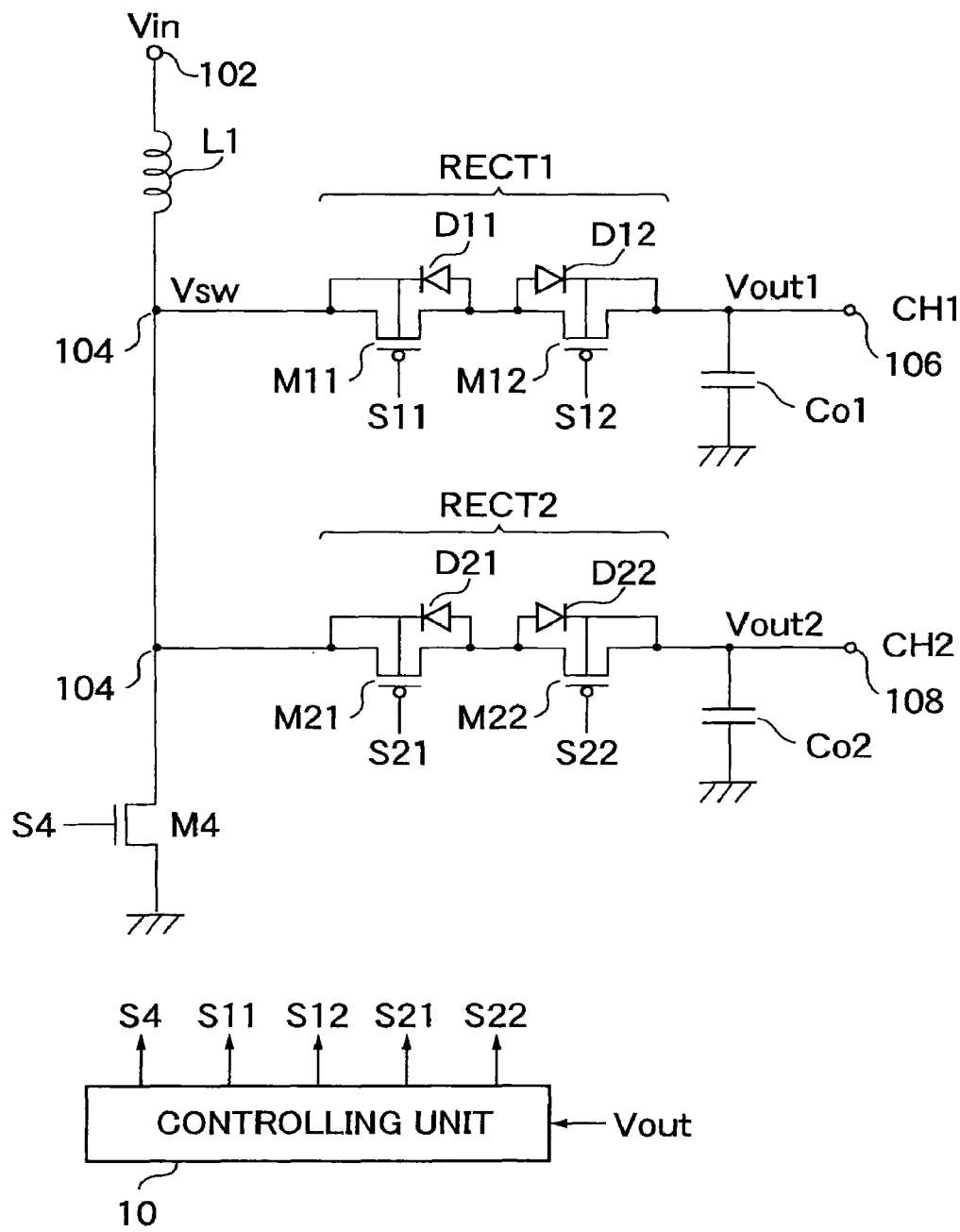
FIG. 1 is a view illustrating a configuration of a switching regulator according to an embodiment of the present invention.

FIG. 1 shows a configuration of a switching regulator (DC/DC converter) 100 according to an embodiment of the present invention. This switching regulator 100 is a step-up type switching regulator that raises the voltage of the input voltage Vin that has been applied to an input terminal 102 and generates output voltages Vout in a plurality of channels.

In the embodiment, description will be given on a case of two channels for simplification; however, the number of channels is arbitrary.

The switching regulator 100 includes a main transistor M4, an inductor L1, a first rectification circuit RECT1, a second rectification circuit RECT2 (which will be generally referred to as a rectification circuit RECT in accordance with the needs), a first output capacitor Co1, a second output capacitor Co2 (which will be generally referred to as an output capacitor Co), and a controlling unit 10.

The inductor L1 and the main transistor M4 are disposed in series between an input terminal 102 and a fixed voltage terminal (ground terminal). The main transistor M4 is an N-channel MOSFET, and the gate thereof receives input of a control signal S4. When the control signal S4 is at a high level, the main transistor M4 is turned on, whereas when the control signal S4 is at a low level, the main transistor M4 is turned off. The connection point of the inductor L1 and the main transistor M4 is referred to as a switching terminal 104, and the voltage generated at the switching terminal 104 is referred to as a switching voltage Vsw.

The first output capacitor Co1 and the second output capacitor Co2 are provided for respective channels. The first output capacitor Co1 is disposed between a corresponding first output terminal 106 and the ground terminal, whereas the second output capacitor Co2 is disposed between a corresponding second output terminal 108 and the ground terminal.

The first rectification circuit RECT1 and the second rectification circuit RECT2 are provided respectively for the first output terminal 106 and the second output terminal 108. The first rectification circuit RECT1 is disposed between the corresponding first output terminal 106 and the switching terminal 104, whereas the second rectification circuit RECT2 is disposed between the corresponding second output terminal 108 and the switching terminal 104.

The rectification circuit of at least one channel is constructed as a so-called synchronous rectification circuit that includes a transistor whose on-off is controlled in synchronization with the main transistor M4 as a rectification element.

In FIG. 1, the first rectification circuit RECT1 and the second rectification circuit RECT2 are both constructed as a synchronous rectification circuit.

The first rectification circuit RECT1 includes a first synchronous rectification transistor M11 and a second synchronous rectification transistor M12 that are disposed in series between the corresponding output terminal 106 and the switching terminal 104. The first synchronous rectification transistor M11 is disposed in a direction such that the cathode of the body diode D11 is on the switching terminal 104 side. The second synchronous rectification transistor M12 is disposed in a direction such that the cathode of the body diode D12 is on the output terminal 106 side.

The first synchronous rectification transistor M11 and the second synchronous rectification transistor M12 are both P-channel MOSFETs, and control signals S11 and S12 are input into the respective gates thereof. The back gate of the first synchronous rectification transistor M11 is connected to the terminal thereof on the switching terminal 104 side, and the back gate of the second synchronous rectification transistor M12 is connected to the terminal thereof on the output terminal 106 side. When the control signal S11 is at a low level, the first synchronous rectification transistor M11 is turned on. When the control signal S12 is at a low level, the second synchronous rectification transistor M12 is turned on.

Similarly, the second rectification circuit RECT2 includes a first synchronous rectification transistor M21 and a second synchronous rectification transistor M22 that are disposed in series between the corresponding output terminal 108 and the switching terminal 104. The first synchronous rectification transistor M21 is disposed in a direction such that the cathode of the body diode D21 is on the switching terminal 104 side. The second synchronous rectification transistor M22 is disposed in a direction such that the cathode of the body diode D22 is on the output terminal 108 side. The gates of the first synchronous rectification transistor M21 and the second synchronous rectification transistor M22 receive input of the control signals S21 and S22.

The inductor L1, the main transistor M4, and the first rectification circuit RECT1 constitute a first channel CH1, and the inductor L1, the main transistor M4, and the second rectification circuit RECT2 constitute a second channel CH2.

The controlling unit 10 generates a pulse signal whose duty ratio is controlled so that the output voltages Vout1, Vout2 of the respective channels will be constant, and controls the main transistor M4 and the rectification circuits RECT1, RECT2 of the respective channels in accordance with the pulse signal. The pulse signal can be generated, for example, with use of a known technique such as the pulse width modulation (PWM) or the pulse frequency modulation (PFM). Also, as a method of stabilizing the output voltage Vout, one can make use of a known technique such as the voltage mode in which the duty ratio of the pulse signal is changed in accordance with the error between the output voltage and the target voltage thereof or the peak current mode in which the peak value of the electric current that flows through the inductor L1 is controlled in accordance with the error between the output voltage and the target voltage thereof, so that the configuration thereof is not particularly limited.

The switching regulator 100 according to the present embodiment is characterized in a method of controlling each transistor by the controlling unit 10. Hereafter, this controlling method will be described in detail.

The controlling unit 10 repetitively controls each channel sequentially. As a basic operation, the controlling unit 10 in each channel repeats a state in which the main transistor M4 is turned on to store energy in the inductor L1 and a state in which the electric current flowing through the inductor L1 is rectified by the rectification circuit RECT1 (RECT2) to be supplied to the output capacitor Co1 (Co2).

When one pays attention to the control of the rectification circuit RECT of each channel, the following characteristics 1 to 6 will be seen.

1. The controlling unit 10 first turns on the first synchronous rectification transistor, and then turns on the second synchronous rectification transistor. The period of time during which the second synchronous rectification transistor is turned on is set in accordance with the pulse width of the pulse signal whose duty ratio is adjusted so that the output voltage of the relevant channel will be approximated to the target value. The pulse width may be in the time of high level, or may be in the time of low level. Namely, one avoids simultaneous turn-on of the first synchronous rectification transistor and the second synchronous rectification transistor.

According to this method, the switching terminal 104 and the output terminal 106 (108) are coupled with the body diode D12 (D22) of the second synchronous rectification transistor M12 (M22) in the period from the time when the first synchronous rectification transistor M11 (M21) is turned on to the time when the second synchronous rectification transistor M12 (M22) is turned on. Namely, the switching terminal 104 will not be in a high-impedance state, and the switching voltage Vsw of the switching terminal 104 will be clamped to Vout1+Vf (or Vout2+Vf), so that the rise thereof can be restrained.

2. Further, the controlling unit 10 turns on the first synchronous rectification transistor M11 (M21) before the main transistor M4 is turned off. By this, the period of time during which the switching terminal 104 is at a high impedance can be substantially eliminated, thereby more effectively restraining the overvoltage.

3. Also, the controlling unit 10 turns on the first synchronous rectification transistor M11 (M21) at a timing such that the main transistor M4 is turned on. This eliminates the need for separately generating a timing such that the first synchronous rectification transistor M11 (M21) is turned on, thereby facilitating the control and simplifying the circuit configuration.

4. Further, the controlling unit 10 turns on the second synchronous rectification transistor M12 (M22) after the main transistor M4 is turned off. This prevents electric conduction between the first output terminal 106 (108) and the fixed voltage terminal (ground terminal) via the main transistor M4 and the rectification circuit RECT1 (RECT2).

5. The controlling unit 10 may turn off the first synchronous rectification transistor M11 (M21) at a timing such that the main transistor M4 is turned on next. This eliminates the need for separately generating a timing such that the first synchronous rectification transistor M11 (M21) is turned off, thereby facilitating the control and simplifying the circuit configuration.

Figure 2:
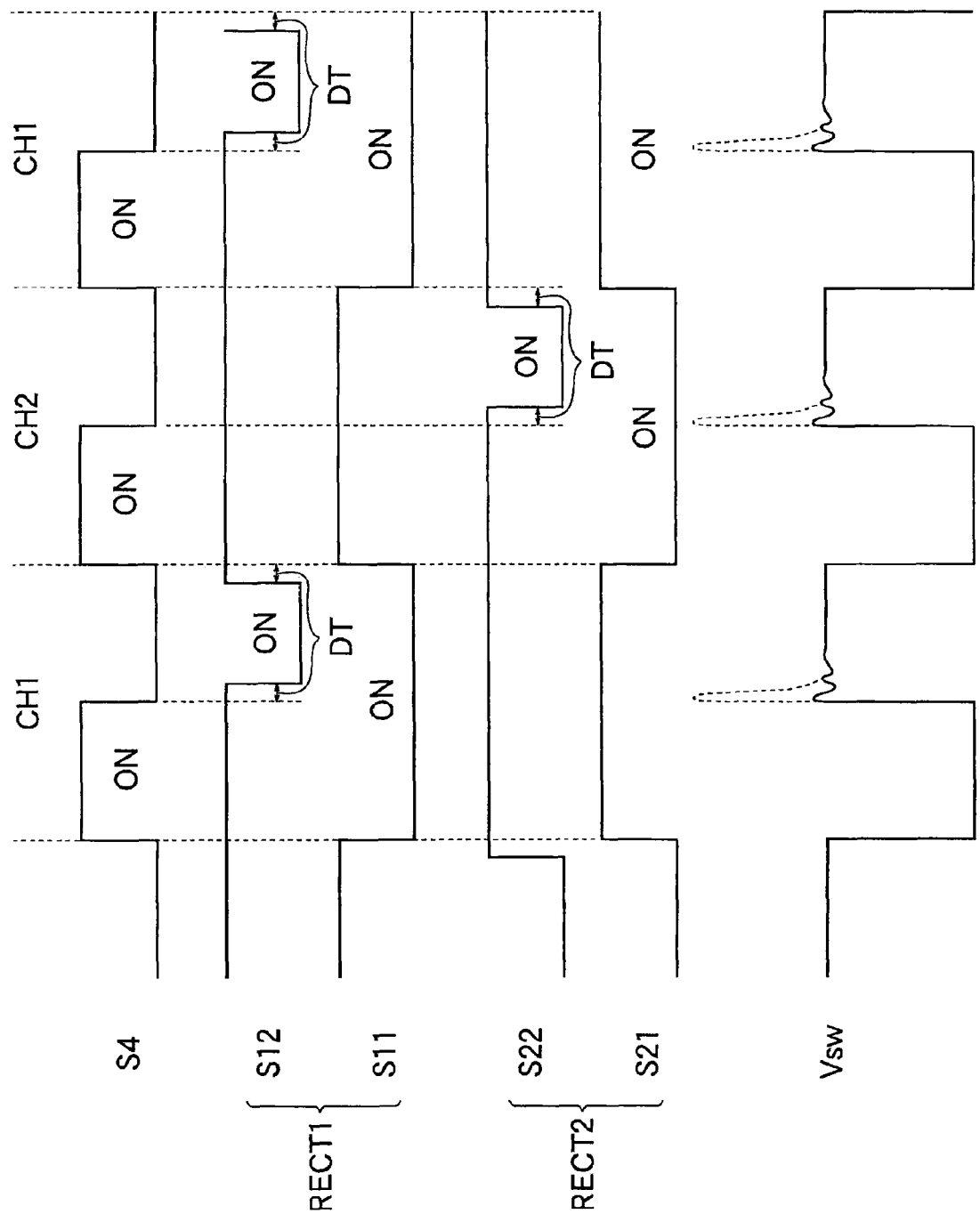
FIG. 2 is a time chart showing a control sequence of the switching regulator of FIG. 1 in an ordinary loaded state.

The above description is on a method of controlling the continuous mode in a loaded state in which the load current is comparatively large. FIG. 2 is a time chart showing a control sequence of the switching regulator 100 of FIG. 1 in an ordinary loaded state. In FIG. 2, DT denotes the dead time.

In the case of a conventional controlling method in which the first synchronous rectification transistor M11 and the second synchronous rectification transistor M12 are turned on immediately after the main transistor M4 is turned off, the switching voltage Vsw swings to an overvoltage as shown by the broken line. In contrast, by the controlling method according to the present embodiment, the swing of the switching voltage Vsw can be restrained as shown by the solid line.

Next, description will be made on a suitable controlling method in a lightly loaded state in which the load current decreases.

6. The controlling unit 10 in a lightly loaded state repeats the state φ1 in which the main transistor M4 and the first synchronous rectification transistor M11 (M21) are turned on, the state φ2 in which the first synchronous rectification transistor M11 (M21) and the second synchronous rectification transistor M12 (M22) are both turned on, and the state φ3 in which only the first synchronous rectification transistor M11 (M21) is turned on when the electric current flowing through the rectification circuit RECT1 (RECT2) is inverted.

The detection of the lightly loaded state may be realized by using a known technique, and the method thereof is not limited. For example, the electric current flowing through the rectification circuit RECT1 (RECT2) may be monitored so as to detect a timing such that the electric current flowing from the switching terminal 104 to the output terminal 106 (108) becomes zero or negative. Alternatively, the switching voltage Vsw may be monitored so as to detect a lightly loaded state by comparing the switching voltage Vsw with a threshold value voltage that is set around 0 V.

Figure 3:
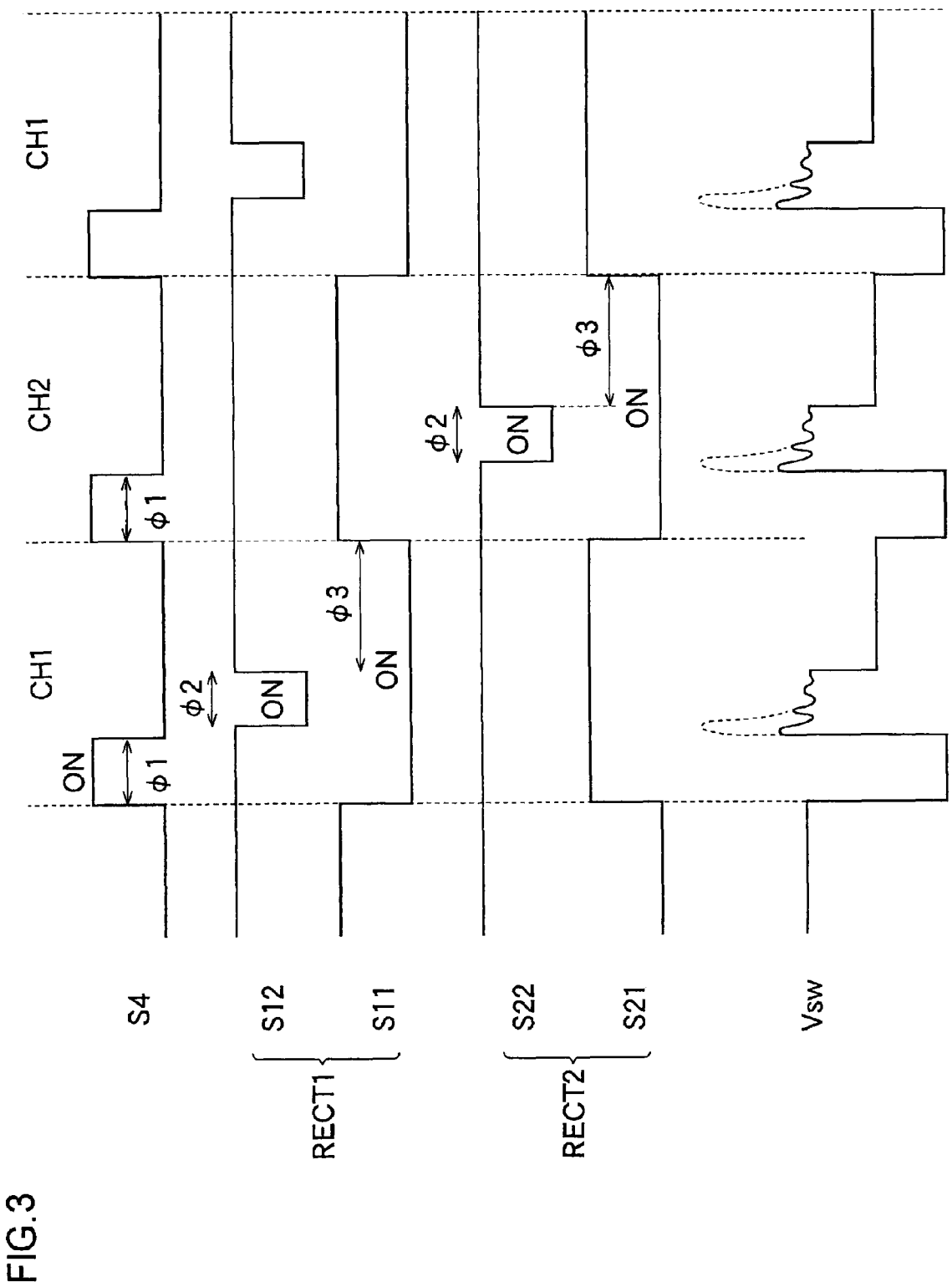
FIG. 3 is a time chart showing a control sequence of the switching regulator of FIG. 1 in a lightly loaded state.

FIG. 3 is a time chart showing a control sequence of the switching regulator 100 of FIG. 1 in a lightly loaded state.

In the lightly loaded state as well, in the case of a conventional control method in which the first synchronous rectification transistor M11 and the second synchronous rectification transistor M12 are turned on immediately after the main transistor M4 is turned off, the switching voltage Vsw swings to an overvoltage as shown by the broken line. In contrast, by the controlling method according to the present embodiment, the swing of the switching voltage Vsw can be restrained as shown by the solid line.

The above embodiment is an exemplification, and it will be understood by those skilled in the art that various modifications can be made on the combination of those constituent elements and treatment processes, and that those modifications are also comprised within the scope of the present invention. Hereafter, such modifications will be described.

The time charts of FIGS. 2 and 3 of the embodiment show a case where the above-described characteristic features 1 to 6 of the method of controlling the main transistor M4, the first rectification circuit RECT1, and the second rectification circuit RECT2 are all satisfied; however, the present invention is effective for arbitrary combinations.

Also, the following modifications can be considered as a circuit topology.

First Modification

In the switching regulator 100 of FIG. 1, the arrangement of the first synchronous rectification transistor M11 and the second synchronous rectification transistor M12 may be reversed. Similarly, the arrangement of the first synchronous rectification transistor M21 and the second synchronous rectification transistor M22 may be reversed.

Second Modification

When the output voltage Vout1 of the first channel CH1 is higher than the output voltage Vout2 of the second channel CH2, the first synchronous rectification transistor M11 of the first rectification circuit RECT1 of the switching regulator 100 of FIG. 1 will not be used. In this case, the control signals S12, S21, S22 may be generated in the same manner as in the above-described embodiment.

Third Modification

In the second modification, the back gate of the first synchronous rectification transistor M21 may be connected to the first output terminal 106.

As the diodes D11, D12, D21, D22, one can make use of individually formed diodes in place of the body diodes of the MOSFETs.

In the embodiment, description has been made on the switching regulator of two-channel output; however, the present invention can be applied to a switching regulator of three or more channels.

The elements constructed with MOSFETs in the embodiment can be replaced with different transistors such as bipolar transistors. The selection of these can be determined in accordance with the semiconductor process, the cost, and the specification demanded in the circuit.

While the preferred embodiments of the present invention have been described using specific terms, such description is for illustrative purposes only, and it is to be understood that changes and variations may be made without departing from the spirit or scope of the appended claims.

What is claimed is:

1. A step-up type switching regulator that raises a voltage of an input voltage and generates output voltages in a plurality of channels, comprising:

an inductor and a main transistor that are disposed in series between an input terminal to which the input voltage is applied and a fixed voltage terminal;

a plurality of output capacitors that are disposed for respective output terminals of a plurality of channels;

a plurality of rectification circuits that are disposed between respective output terminals and a switching terminal which is a connection point of the inductor and the main transistor, for respective output terminals of the plural channels; and a controlling unit that generates a pulse signal whose duty ratio is controlled so that the output voltage of each channel will be constant, and controls the main transistor and the rectification circuit of each channel in accordance with the pulse signal, wherein the rectification circuit of at least one channel includes a first synchronous rectification transistor and a second synchronous rectification transistor that are disposed in series between a corresponding one of the output terminals and the switching terminal, where the first synchronous rectification transistor is disposed in a direction such that a cathode of a body diode thereof is on the switching terminal side, and the second synchronous rectification transistor is disposed in a direction such that a cathode of a body diode thereof is on the output terminal side, and the controlling unit first turns on the first synchronous rectification transistor, and then turns on the second synchronous rectification transistor for a period of time in accordance with a pulse width of the pulse signal.

2. The switching regulator according to claim 1, wherein the controlling unit turns on the first synchronous rectification transistor before the main transistor is turned off.

3. The switching regulator according to claim 2, wherein the controlling unit turns on the first synchronous rectification transistor at a timing when the main transistor is turned on.

4. The switching regulator according to claim 1, wherein the controlling unit turns on the second synchronous rectification transistor after the main transistor is turned off.

5. The switching regulator according to claim 1, wherein the controlling unit turns off the first synchronous rectification transistor at a timing when the main transistor is turned on next.

6. The switching regulator according to claim 1, wherein the controlling unit in a lightly loaded state repeats:
a state in which the main transistor and the first synchronous rectification transistor are turned on;
a state in which the first synchronous rectification transistor and the second synchronous rectification transistor are turned on; and
a state in which the first synchronous rectification transistor is turned on.

7. A method of controlling a step-up type switching regulator that raises a voltage of an input voltage and generates output voltages in N channels (N is an integer of two or more), wherein
the step-up type switching regulator comprises:
an inductor and a main transistor that are disposed in series between an input terminal to which the input voltage is applied and a fixed voltage terminal;
N output capacitors that are disposed in series between respective output terminals and the fixed voltage terminal for respective output terminals of the N channels; and
N rectification circuits that are disposed between respective output terminals and a switching terminal which is a connection point of the inductor and the main transistor, for respective output terminals of the N channels,
the rectification circuit of at least one channel includes a first synchronous rectification transistor and a second synchronous rectification transistor that are disposed in series between a corresponding one of the output terminals and the switching terminal, where the first synchronous rectification transistor is disposed in a direction such that a cathode of a body diode thereof is on the switching terminal side, and the second synchronous rectification transistor is disposed in a direction such that a cathode of a body diode thereof is on the output terminal side, and
the controlling method, while incrementing i, repetitively executes:
turning on the main transistor for a certain period of time;
turning on the first synchronous rectification transistor of an i-th channel for a certain period of time; and
turning on the second synchronous rectification transistor of the i-th channel for a certain period of time after the first synchronous rectification transistor of the i-th channel is turned on.

8. The controlling method according to claim 7, wherein the first synchronous rectification transistor of the i-th channel is turned on before the main transistor is turned off.

9. The controlling method according to claim 8, wherein a timing when the main transistor is turned on is simultaneous with a timing when the first synchronous rectification transistor of the i-th channel is turned on.

10. The controlling method according to claim 7, wherein the second synchronous rectification transistor of the i-th channel is turned on after the main transistor is turned off.

11. The controlling method according to claim 7, wherein a timing when the first synchronous rectification transistor of the i-th channel is turned off is simultaneous with a timing when the main transistor is turned on after i is incremented.

12. The controlling method according to claim 7, further comprising generating a pulse signal for each channel whose duty ratio is controlled so that the output voltages of the N channels will be approximated to respective target values, wherein
the second synchronous rectification transistor of the i-th channel is turned on for a period of time in accordance with a pulse width of the pulse signal of the i-th channel.

* * * * *